United States Patent
Cartmell et al.

(10) Patent No.: US 8,375,174 B1
(45) Date of Patent: Feb. 12, 2013

(54) TECHNIQUES FOR USE WITH MEMORY PARTITIONING AND MANAGEMENT

(75) Inventors: Jerome Cartmell, Natick, MA (US); Steven McClure, Northboro, MA (US); Alesia Tringale, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 375 days.

(21) Appl. No.: 12/798,035

(22) Filed: Mar. 29, 2010

(51) Int. Cl.
*G06F 12/00* (2006.01)

(52) U.S. Cl. ........ 711/148; 711/147; 711/153; 711/170; 711/173; 711/E12.084

(58) Field of Classification Search .................. 711/147, 711/148, 153, 170, 173, E12.084
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 2006/0059323 A1* | 3/2006 | Rao | 711/170 |
| 2011/0125974 A1* | 5/2011 | Anderson | 711/153 |

OTHER PUBLICATIONS

U.S. Appl. No. 12/798,034, filed Mar. 29, 2010, Cartmell, et al.

* cited by examiner

*Primary Examiner* — Midys Rojas
(74) *Attorney, Agent, or Firm* — Muirhead and Saturnelli, LLC

(57) ABSTRACT

Described are techniques for partitioning memory. A plurality of boards is provided. Each of the plurality of boards includes a physical memory portion and a set of one or more processor. The physical memory portion in each of said plurality of boards is partitioned into a plurality of logical partitions including a global memory partition accessible by any processor on any of the plurality of boards and one or more other memory partitions configured for use by one or more processors of said each board. Each of the one or more other memory partitions not being accessible to a processor on a board other than said each board.

19 Claims, 13 Drawing Sheets

TECHNIQUES FOR USE WITH MEMORY PARTITIONING AND MANAGEMENT

BACKGROUND

1. Technical Field

This application generally relates to memory usage, and more particularly to techniques used for memory partitioning and management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

Memory may be included within a data storage system and, more generally, in any type of system or device using a processor. The memory may be configured for use with one or more processors, or directors, for various purposes such as caching. In connection with data storage systems such as by EMC Corporation, various types of directors or adapters may be implemented as a processor, or, more generally, a component that includes the processor. Examples of directors are disk adapters (DAs), host adapters (HAs) and the like. In one arrangement, a first set of one or more memory boards may be configured to include only global memory. The first set of boards does not include any directors. A second set of one or more boards may be configured to include directors and not any global memory. Memory, such as of the first set of boards, designated as global memory is accessible for use by any director included in the second set of boards. In the foregoing arrangement, the global memory is configured to be physically segregated on separate boards from other boards including the directors which access the global memory.

SUMMARY OF THE INVENTION

In accordance with one aspect of the invention is a method for partitioning memory. A plurality of boards is provided where each of the plurality of boards includes a physical memory portion and a set of one or more processors. The physical memory portion in each of said plurality of boards is partitioned into a plurality of logical partitions including a global memory partition accessible by any processor on any of the plurality of boards and one or more other memory partitions configured for use by one or more processors of said each board. Each of the one or more other memory partitions is not accessible to a processor on a board other than said each board. The plurality of logical partitions of said each board may comprise three logical partitions of said each board including the global memory partition, a shared memory partition accessible to all processors on said each board, and a private memory partition including a section for each processor on said each board, wherein said shared memory partition on said each board may not be accessible by any processor on a board other than said each board, and wherein each section of the private memory partition used by an associated processor of said each board may be used exclusively by said associated processor. The three logical partitions of said each board may not overlap each other in the physical memory portion of said each board. Each of the global memory partitions of each of said plurality of boards may be located at a same physical location in the physical memory portion on said each board. Each of the plurality of boards may include a fabric connector. Each of the fabric connectors on one of the plurality of boards may be configured to communicate with other fabric connectors on other ones of the plurality of boards. Each processor on one of said plurality of boards may be configured to translate a logical address of said each processor to a physical address identifying a location in one of the physical memory portions of one of the plurality of boards. The physical address may identify a location in a section of the private memory partition for said each processor on said one board, a location in a shared memory partition on said one board, or a location in a global memory partition on any one of the plurality of boards. Each of the fabric connectors may be configured to filter improper requests to access physical memory on said one board including said each fabric connector, said improper requests being received over a connection from another one of the fabric connectors. Each processor on one of said plurality of boards may be configured in accordance with a map indicating what portions of physical memory on a same board as said each processor are accessible to said each processor. A system global memory may include said global memory partitions of said plurality of boards. The plurality of boards may be configured to communicate with one another over a connection used to request access to a location in any one of the global memory partitions on any of said plurality of boards. The map may represent a logical memory mapping of a section of a private memory partition on said one board for said each processor, and a shared memory partition on said one board accessible by all processors on said one board. The global memory partition of a first of said plurality of boards may be located at a first physical location in the physical memory portion on said first board, and the global memory partition of a second of the plurality of boards may be located at a second physical location in the physical memory portion on said second board, and the first physical location may be different from said second physical location. Each processor on one of said plurality of boards may be included in a director of a data storage system where the director also may include a memory management unit. The memory management unit of each director may be configured to use a map representing locations accessible to said each director where said locations are in physical memory on a board including said each director.

The memory management unit may restrict access to physical memory locations represented by the map. The memory management unit may be configured to use a global memory map representing a logical to physical mapping of a system global memory including said global memory partitions of said plurality of boards. The global memory map may represent a global memory logical address space mapped to physical segments of alternating global memory partitions on said plurality of boards. Each of the physical segments of memory may have a first size which is less than a second size of any global memory partition on any of said plurality of boards.

In accordance with another aspect of the invention is a data storage system comprising a plurality of boards, each of said plurality of boards including a physical memory portion and a set of one or more directors. The physical memory portion in each of said plurality of boards is partitioned into a plurality of partitions including three logical partitions comprising a global memory partition accessible by any director on any of the plurality of boards, a shared memory partition accessible to directors on said each board, and a private memory partition including a section for each director on said each board. The data storage system may further comprise each of said one or more directors on each of said plurality of boards including a processor and a memory management unit configured to use a director map and a global memory map. The director map may represent locations in physical memory accessible to said each director. The memory management unit may restrict access by said each director to physical memory locations represented by the director map. The global memory map may represent a logical to physical mapping of a system global memory including the global memory partitions of said plurality of boards. Each of the plurality of boards may include a fabric connector configured to communicate with other fabric connectors of other ones of said plurality of boards. Each fabric connector on one of the plurality of boards may be configured to restrict access of a received request from another fabric connector to only the global memory partition on said one board. The director map for said each director may specify logical to physical memory mappings for physical memory locations only on a board including said each director.

In accordance with another aspect of the invention is a computer readable medium comprising code stored thereon that partitions memory. The computer readable medium comprises code that partitions a physical memory portion of each of a plurality of boards. Each of the plurality of boards includes a set of one or more processors. The physical memory portion in each of said plurality of boards is partitioned into a plurality of logical partitions including a global memory partition accessible by any processor on any of the plurality of boards and one or more other memory partitions configured for use by one or more processors of said each board. Each of the one or more other memory partitions is not accessible to a processor on a board other than said each board.

DETAILED DESCRIPTION OF EMBODIMENT(S)

Figure 1:
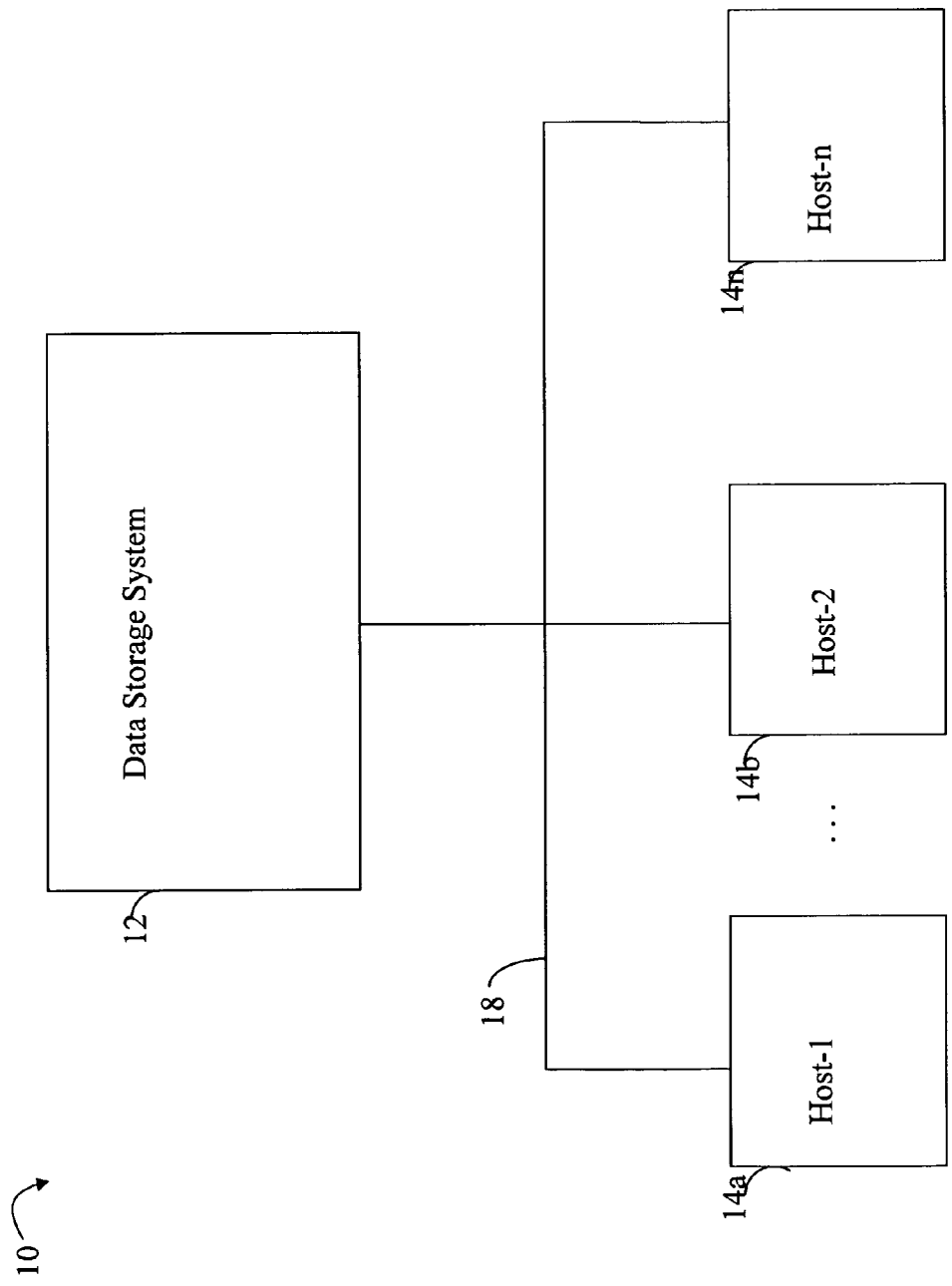
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP, SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
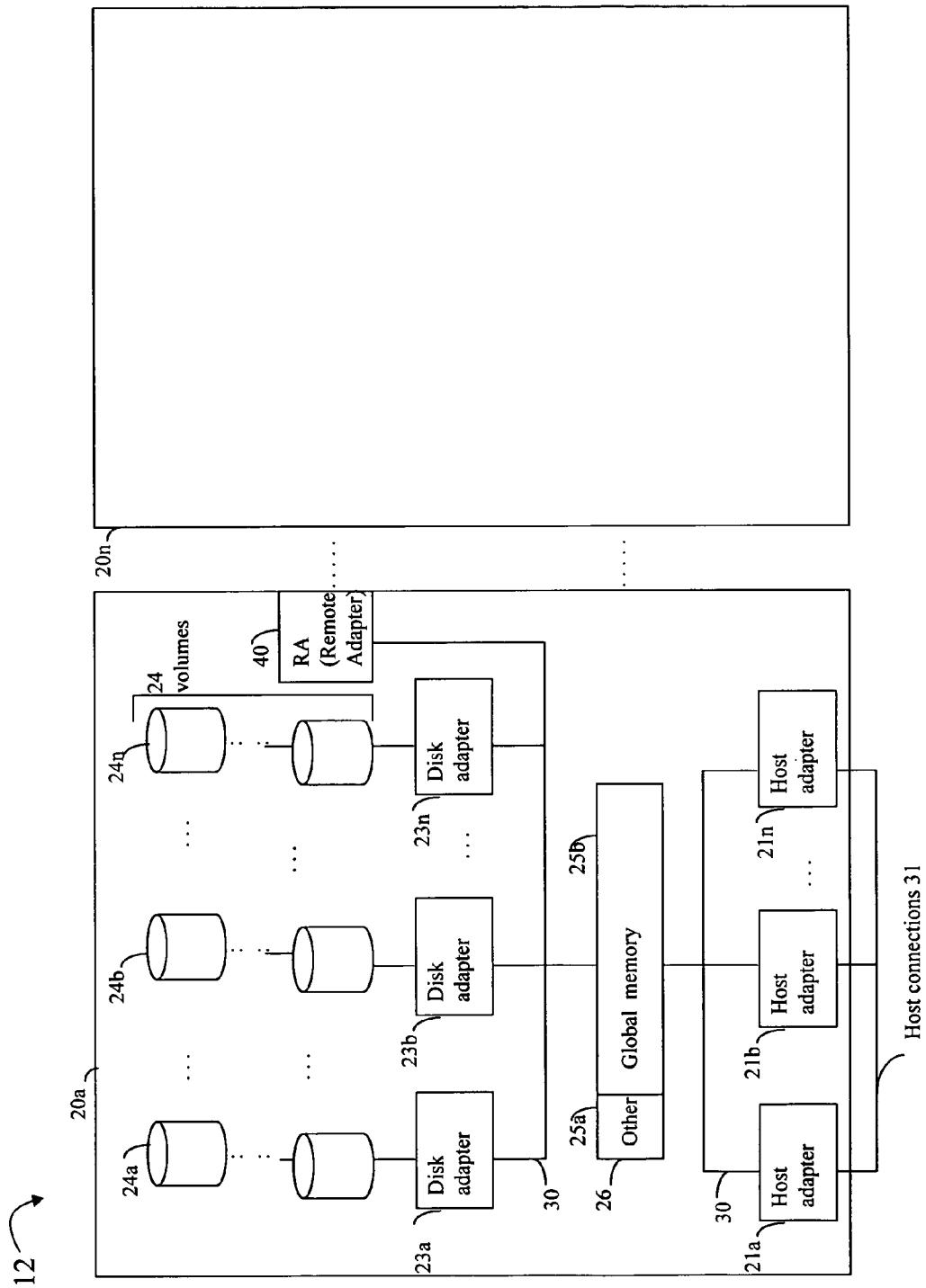
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
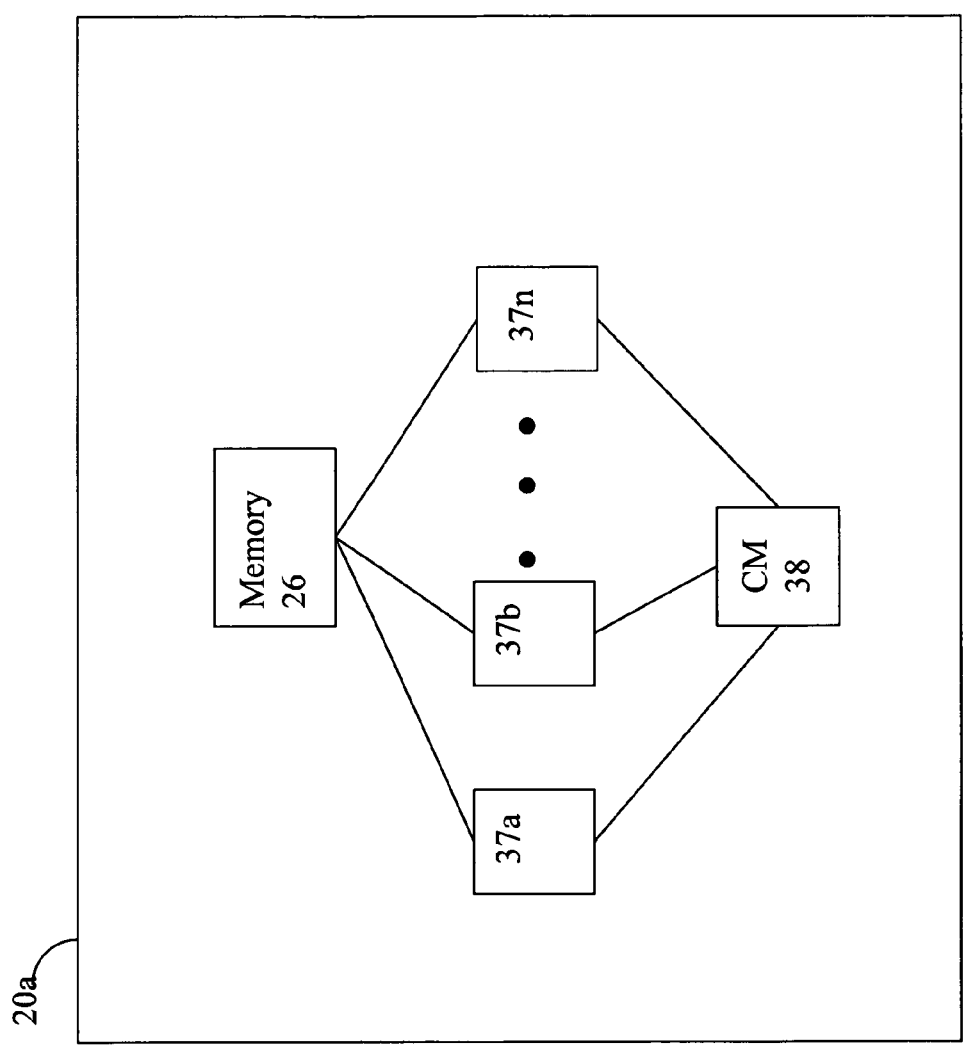
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37*a*-37*n*. Each of the directors 37*a*-37*n* may be coupled to the CM 54 so that any one of the directors 37*a*-37*n* may send a message and/or data to any other one of the directors 37*a*-37*n* without needing to go through the memory 26. The CM 54 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

As mentioned above, memory may be included within a data storage system and, more generally, in any type of system or device using a processor. The memory may be configured for use with one or more processors, or directors as described herein, for various purposes such as caching. Described herein are techniques for partitioning and management of the memory. As set forth in more detail in following paragraphs, a data storage system may include a plurality of boards, each board including both global memory and directors. Each such board may also include memory configured and logically partitioned for use as global memory and also for other purposes. Those portions of the memories configured as global memory may be accessible to any director on any connected board in the system. Techniques are described herein to facilitate use of the memory—including, the global memory, as well as other types of memory—physically integrated with the directors on the plurality of boards. The memory of each of the plurality of boards may be divided into different types of logical memory partitions, the logical memory partitions including a global memory partition and one or more other types of memory partitions. Each of the one or more other types of memory partitions may be configured for use by one or more processors located on the same board as the memory. However, the one or more other types of memory partitions are not accessible for use by a processor on a board different from the board including the memory. Furthermore, as described below, a first of such other memory partitions may be shared by all processors on the same board including the memory, and a second of such other memory partitions may include a plurality of sections of physical memory, where each such section is for exclusive use by only one of the processors on the same board as the memory including the second partition.

Figure 3:
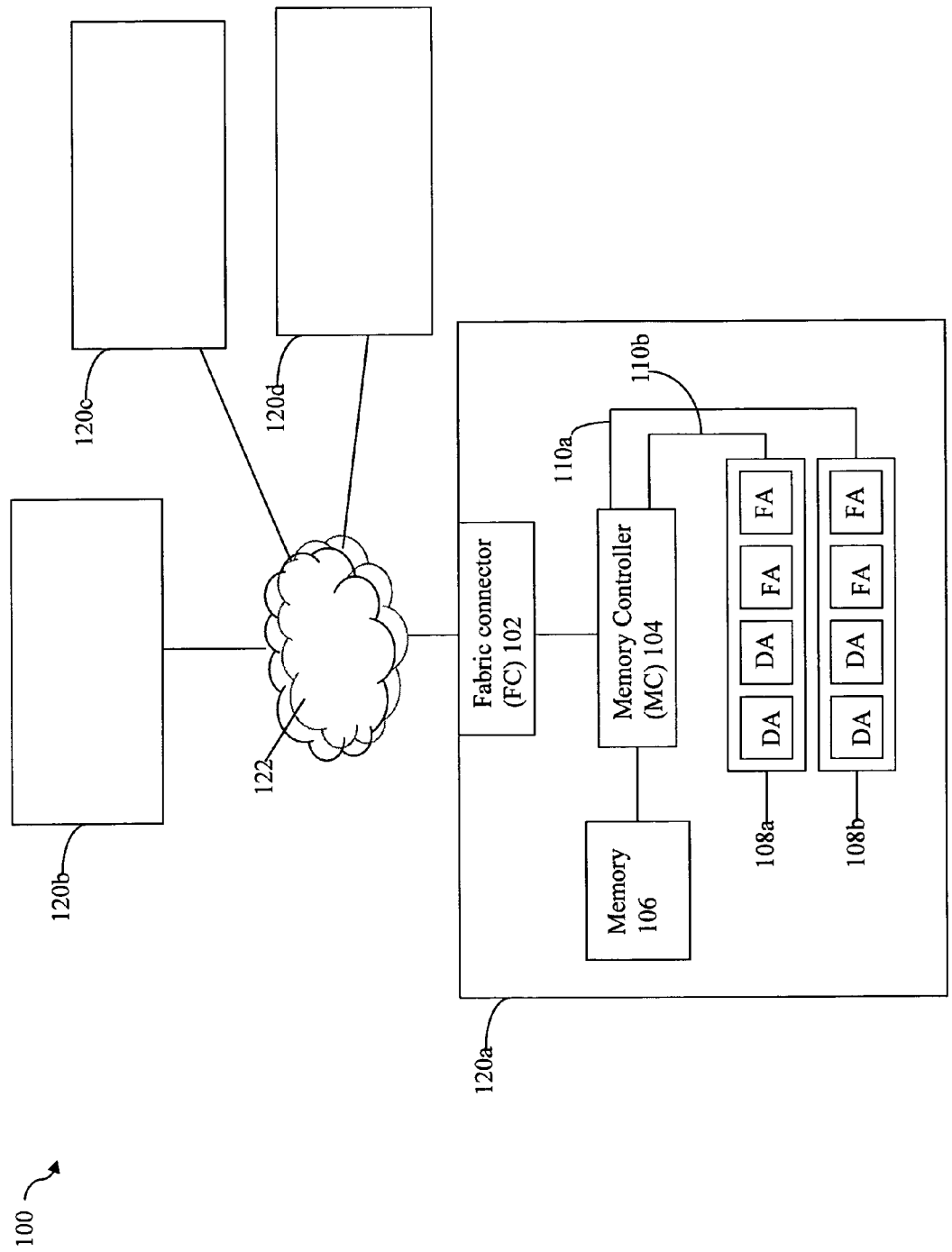
FIG. 3 is an example of setting forth additional detail regarding components of an embodiment of a system that may be used in connection with techniques herein.

Referring to FIG. 3, shown is an example of components that may be included in a data storage system. The example 100 includes a plurality of boards denoted as 120*a*-120*d* which communicate over a fabric to access global memory. The fabric may include a switch 122 and connections between the switch 122 and boards 120*a*-120*d*. Although 4 boards are illustrated herein for exemplary purposes only, an embodiment may include any number of boards in accordance with limitations of a particular embodiment. For example, an embodiment of a data storage system may include any number of boards from 2-16, inclusively. Each board may be a physical board including components thereon as illustrated in more detail in connection with 120*a*. Each board may include a fabric connector (FC) 102, a memory controller (MC) 104, memory 106, a plurality of directors 108*a*-108*b*, and buses 110*a*,110*b* used for communications between the MC 104 and, respectively, the directors of 108*a*, 108*b*. Each board may include one or more different types of directors of varying number. The example 100 illustrates board 120*a* as including 4 DAs and 4FAs in a particular arrangement. However, it will be appreciated by those skilled in the art that a board may include a different number and/or arrangement than as illustrated. The FC 102 is configured to facilitate communications between the board 120*a* and other boards 120*b*-120*d* connected to the fabric, and each other, through switch 122. The MC 104 communicates with the FC 102 and directors 108*a*, 108*b* for accessing the memory 106. In one embodiment, each of the FC and MC may be implemented as an application specific integrated circuit (ASIC) configured to perform the functionality described herein.

Although detail of components that may be stored on a single board is only illustrated with respect to board 120*a*, each of the other boards 120*b*-120*d* connected to the switch 122 may also be similarly configured. Memory 106 of each of the boards connected to the fabric may be partitioned into a plurality of different logical partitions as will now be described in more detail.

Figure 4:
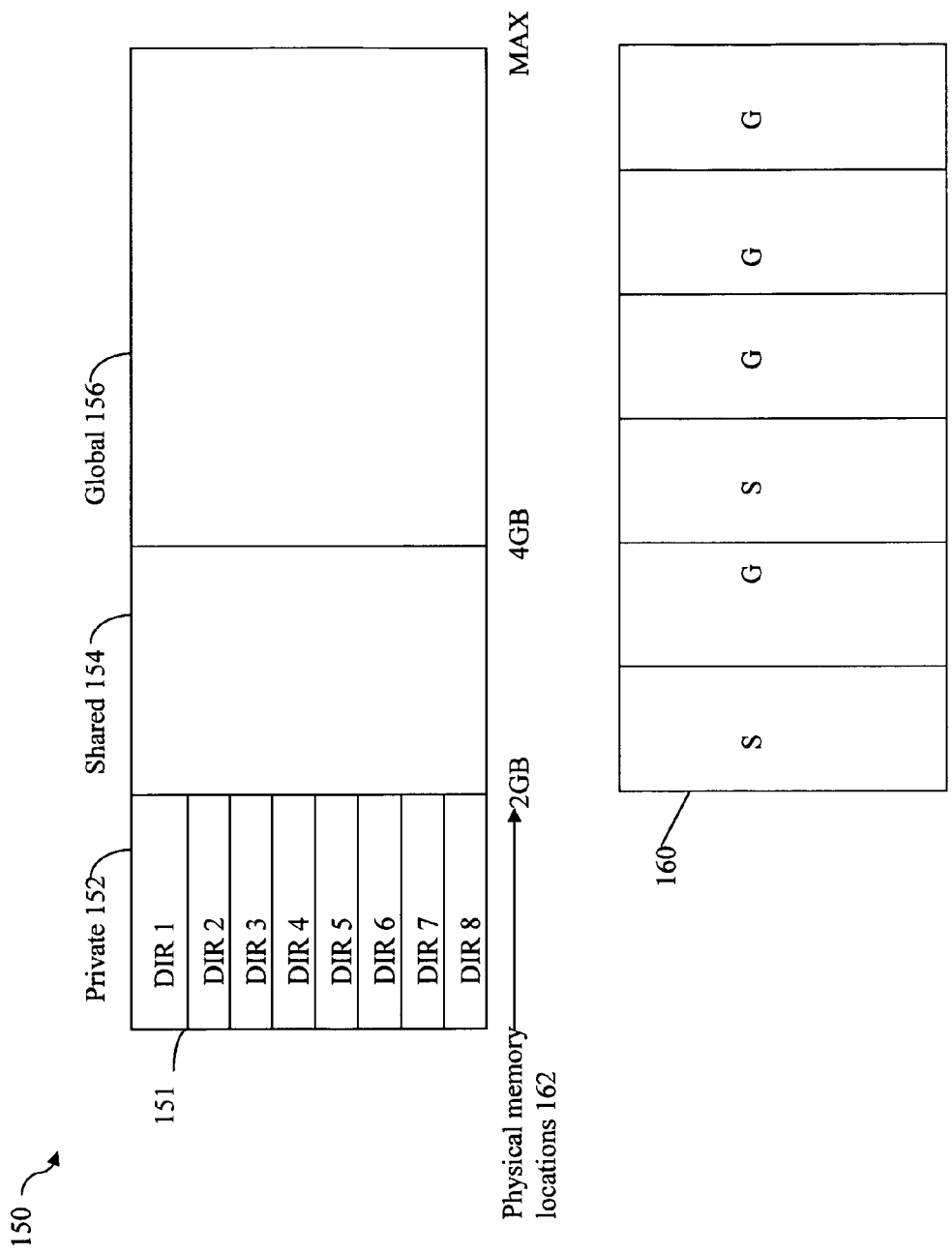
FIG. 4 is an example illustrating logical partitioning of memory of a single board in an embodiment in accordance with techniques herein.

Referring to FIG. 4, shown is an example of how physical memory (e.g., element 106) of a single board of FIG. 3 connected to the global memory fabric of the data storage system may be logically partitioned. It should be noted that the example 150 illustrates a logical partitioning of a physical memory portion as may be included on a single board although each such board 120*a*-120*d* of FIG. 3 may be configured as illustrated in FIG. 4. The example 150 illustrates three types or classes of logical partitions including a private partition 152, shared partition 154, and global partition 156. The private partition 152 includes a segment for each director on the single board. Each such segment of memory included in 152 (denoted DIRa, "a" uniquely identifying the associated one of the directors on the board) is associated with a different one of the directors for exclusive use only by the single associated director. No other director on the same single board or another board is allowed to access the segment of the private partition designated for the associated director. The shared partition 154 is memory that is common or shared among any director on the single board. However, no director on any other board of the fabric is allowed to access memory of portion 154 and rather, access to memory of 154 is restricted to those directors on the single board (e.g., same board as the shared partition 154). Global partition 156 includes memory which is accessible or usable across the internal fabric. In other words, with reference to FIG. 3, any director on any of the boards 120*a*-120*b* may access the memory of the global partition 156. As an example, a first global partition of board 120*a* is accessible by any director on board 120*a* and also any director of any of the other boards 120*b*-120*d* connected to the fabric, such as through switch 122. The shared partition of board 120*a* is accessible only to directors of board 120*a* and no other director in any of boards 120*b*-120*d*.

In one embodiment, the size of the memory of a single board (e.g., representing the collective physical memory size for the logical partitions 152, 154 and 156 of a single board) may be in the inclusive range of 8 GB-64 GB. The size of 152 may be 2 GB and may be further divided into equally sized segments for each of the directors on the board. The size of 154 may be 2 GB. The remaining amount of memory may be configured for the global partition 156. The sizes of 152 and 154 may remain constant or independent of the total size of the memory. Therefore, as the total amount or size of the memory for partitions 152, 154, and 156 increases, the size of 156 increases while sizes of 152 and 154 may remain constant at 2 GB each. The foregoing are exemplary sizes for purposes of illustration and may vary with each embodiment. As illustrated in one embodiment of FIG. 4, the private partition 152 may be located at physical memory locations 0 through (2 GB-1), the shared partition 154 may be located at physical memory locations 2 GB through (4 GB-1), and the global partition 156 may be located at physical memory locations 4 GB through MAX (end location of the memory).

Although each type (152, 154 and 156) of partition in 151 is illustrated as a contiguous segment of physical memory, each logical partition type on a single board may also include physically non-contiguous segments within the physical memory of the single board. For example, memory of the private partition 152, shared partition 154, and/or global partition 156 may consist of a plurality of physically non-contiguous memory segments with respect to a single board. For example, element 160 may represent a physical memory layout of physical memory segments of a single board for the board's shared logical partition 154 and global logical partition where the segments are physically non-contiguous and interspersed. Each segment of 160 denoted with an "S" indicates that segment is included in 154 and each segment of 160 denoted with a "G" indicates that segment is included in 156. FIG. 4 illustrates different exemplary ways in which the logical partition types may be physically outlayed in memory with respect to a single board's memory.

The logical partitioning illustrated in FIG. 4 for each of the boards connected to the fabric may be implemented using maps which map physical memory of the boards to a logical representation. Each director may have an individual director-specific logical memory map. Additionally, all of the global partitions from the boards connected to the fabric (e.g., all global memory partitions of boards 120a-120d) may collectively represent a distributed global memory, or system global memory, having its own logical representation. The foregoing is described in more detail in following paragraphs. Additionally, as also described in more detail below, the FCs of the boards and an MMU (memory management unit) included in each director may provide for protecting and restricting access by directors and FCs to appropriate portions of physical memory located on the boards in accordance with the individual director logical representations of the director-specific memory maps and the logical representation of the distributed global memory partitions.

Figure 5:
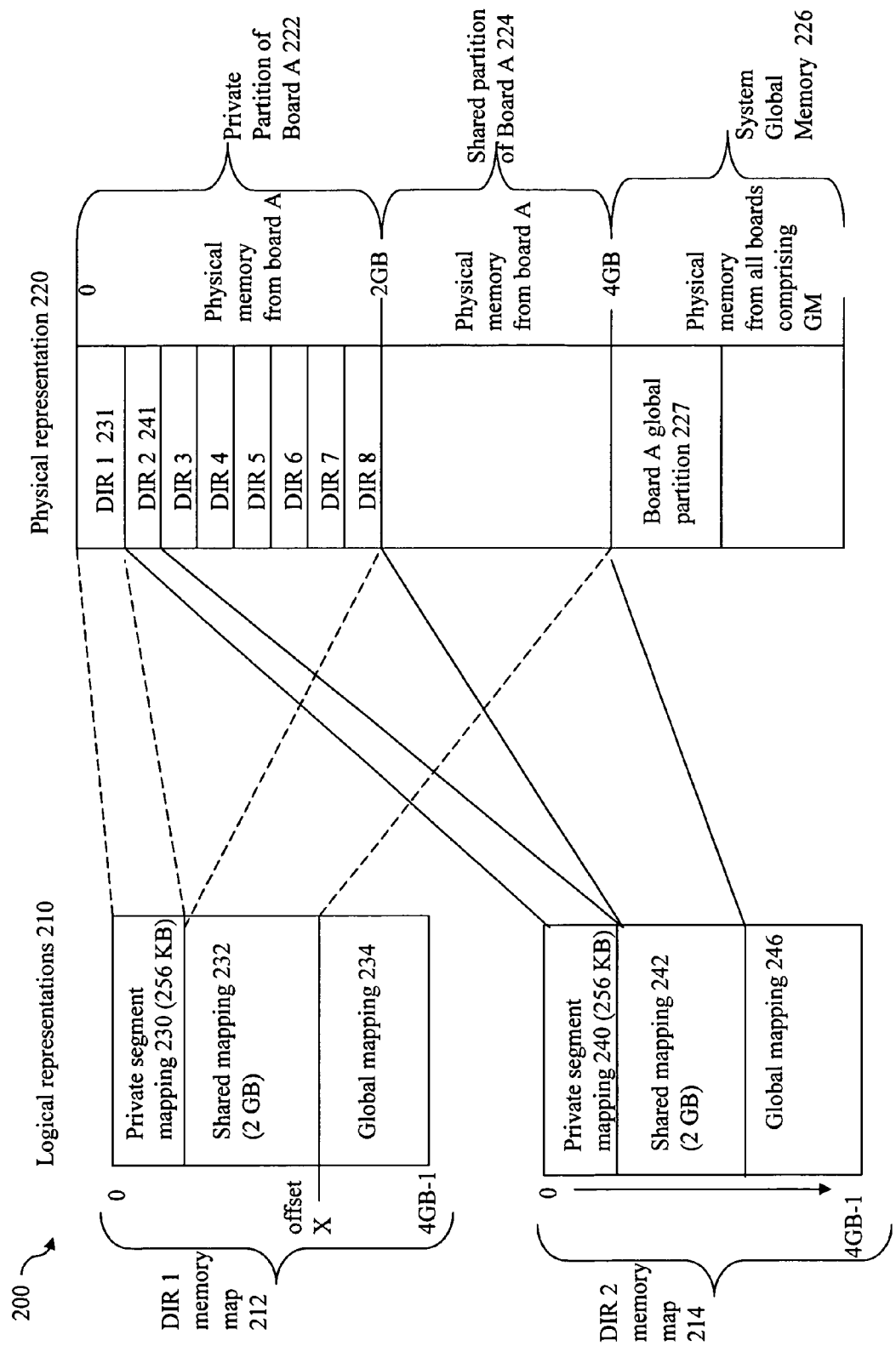
FIGS. 5 and 6 are examples of different maps that may be used in an embodiment in accordance with techniques herein.

Referring to FIG. 5, shown is an example of director-specific memory maps providing a logical memory representation or view of physical memory for two directors of a single board. The example 200 includes logical representations 210 for DIR 1 (Director 1 memory map 212) and DIR 2 (Director 2 memory map 214) and illustrates how the logical address space of directors may be mapped to physical memory of physical representation 220. Only two memory maps 212 and 214 are included in 200 for simplicity of illustration although other directors on the same board also have similar director-specific memory maps. The maps 212 and 214 identify, for a given director, which locations in physical memory on the same board as directors 1 and 2 are accessible to the given director. A director has access to those physical memory locations which are mapped into the director-specific memory map. For example, the MMU of Director 1 uses memory map 212 to restrict Director 1's access to physical memory locations currently mapped in 212. Similarly, the MMU of Director 2 uses memory map 214 to restrict Director 2's access to physical memory locations currently mapped in 214. Each director's MMU may be used to restrict the director's access to appropriate portions of memory of all logical partitions and types (e.g., private, shared and global) which are included in the director's map and where such memory is physically located on the same board as the director. However, each MMU cannot control access to any memory not located on the same physical board as the director's MMU such as, for example, a location in a global partition of another board. As described in more detail elsewhere herein, the FCs are used to control access to such global partitions such as, for example, where a global memory access request is made from a first board to access a global memory having a physical location on a second different board.

In connection with following description, assume that director 1 and director 2 are located on a same board A. The physical representation 220 includes physical memory as represented by element 222, 224 and 226. When locations of the foregoing physical memory of 220 are mapped into a director-specific memory map of a director, that director can access the mapped physical memory locations. The physical representation 220 includes physical memory locations 0 through (2 GB-1) of board A's private partition 222, and physical memory locations 2 GB through (4 GB-1) of board A's shared partition 224. Element 226 may also be referred to as system global memory and denotes, collectively, the physical memory portions of all boards comprising global memory. In other words, element 226 represents the physical memory of all global partitions included in all boards 120a-120d connected to the fabric. The global mappings 234 of map 212 and 246 of map 214 may represent logical address space mapped to global memory physically located in 227 (e.g., on the same board A as director 1 and director 2). It should be noted that 234 and 246 may represent a "snapshot" of processor logical address space mapped to physical segments of global memory of board A (same board including directors 1 and 2) at a point in time. Upon completion of system initialization, the logical address space of 234 and 246 may not be mapped to any physical memory. Mapping a processor's logical address space to portions of physical memory of board A, where such physical memory is included in system global memory (e.g., a board's global partition), is described in more detail elsewhere herein.

Each director's director-specific memory map is a representation of how the director's logical address space is mapped to physical memory for the director's unique segment of a private partition, a shared partition, and any system global memory locations accessible to the director which are physically located in memory on that same board as the director. The memory map 212 illustrates that director 1's private segment mapping 230 is mapped to physical memory segment 231 of board A, shared mapping 232 is mapped to a physical memory segment of board A denoted by 224, and global mapping 234 is mapped to physical memory of system global memory 226 residing on board A currently accessible to director 1. Only director 1's map is mapped to segment 231 and therefore only director 1 can access the physical memory of segment 231. Each director on board A has its director-specific memory map include a mapping to physical memory of board A represented by 224. However, no director on a different board includes such a mapping and therefore only directors on board A can access the physical memory of 224. A director on a board may have its director-specific memory map include a mapping to physical memory for any portion of system global memory which is accessible to the director and physically located on the same board as the director. Otherwise, a director requests access to portions of system global memory physically located on a different board using FCs as described elsewhere herein. It should be noted that the logical to physical mapping for portions of global memory as represented by 234 and 246 is described in more detail in following paragraphs.

The memory map 212 also illustrates an exemplary logical address range for directors 1 and 2. For example, with respect to director 1, a logical address in the range 0 through 255 KB refers to a physical address or location in director 1's private segment 231 of board A's private partition. A logical address in the range 256 KB through (2 GB-1) refers to a physical address or location in director 1's shared partition of board A. A logical address equal to, or greater than, 2 GB refers to a global memory (GM) logical address which is mapped to a physical address or location in system global memory, where such location may be in physical memory for a global partition of board A. In a manner similar to that as described for 212, the memory map 214 illustrates director 2's logical to physical mapping.

An initial state of the director-specific memory maps 212 and 214 may be constructed as a result of performing initialization processing of the data storage system using data in an initialization or configuration file. In the foregoing initial state, logical address space ranges of 230, 232, 240 and 242 may be mapped as illustrated to physical memory. However, logical address ranges of 234 and 246 may not be mapped to any physical memory.

Figure 6:
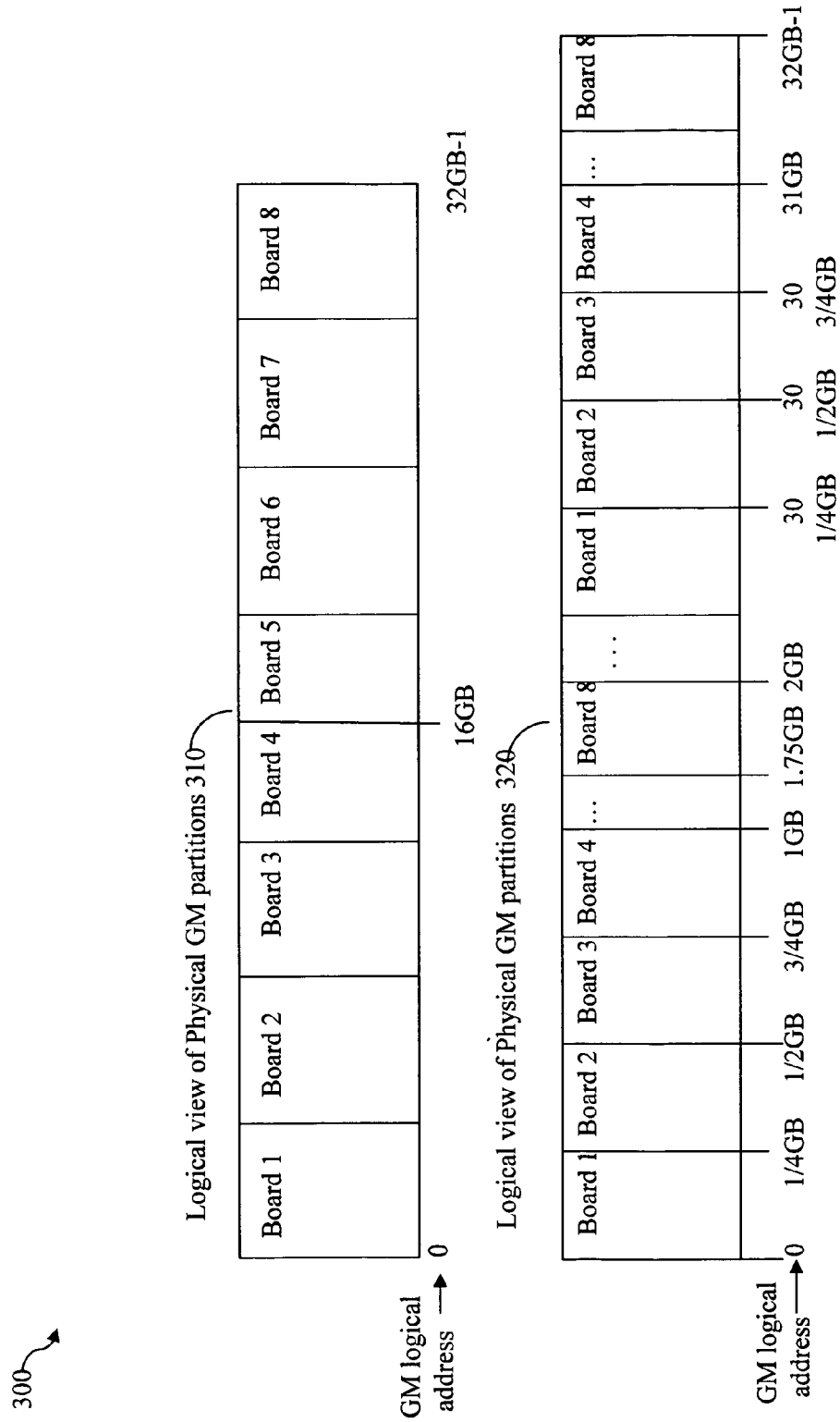

Referring to FIG. 6, shown is an example 300 of system global memory maps that may be used in an embodiment in accordance with techniques herein. The example 300 includes two logical views or representations 310 and 320 illustrating alternative or different logical to physical mappings for system global memory. System global memory as described herein may be characterized as a distributed global memory including an aggregate of global partitions across all boards of the fabric (e.g., elements 120a-120d of FIG. 3). Consider an exemplary arrangement of a distributed system global memory formed across 8 boards with each board having a global partition size of 4 GB and having a memory partitioned as illustrated by 151 of FIG. 4. Thus, the system global memory is 32 GB and each global partition of a board begins at physical location 4 GB of the board's memory. Element 310 may represent a first example of a system global memory map providing a logical view of physical global memory partitions across all 8 boards (e.g., aggregated view of global partitions 156 of all 8 boards). The logical representation of system global memory of 310 may include concatenating physical memory from each of the global partitions of all the boards. It should be noted that "Board n" as indicated in element 310 FIG. 6 represents the entire 4 GB physical memory for the global partition of board n. Element 310 (and also 320 described below) may represent a logical to physical mapping as may be stored in, and used by, the MMU of each director located on a board connected to the fabric to allow the director to perform appropriate logical to physical GM address translation (described in more detail elsewhere herein) and access system global memory.

In accordance with the logical to physical mapping indicated by 310, global memory (GM) logical address 0 maps to physical memory address 4 GB on board 1's memory (e.g., board 1, memory offset or address 4 GB), GM logical address 16 GB maps to physical memory address 4 GB on board 5's memory (e.g., board 5, memory offset or address 4 GB), and so on.

Element 320 represents a second logical view of a system global memory map providing a logical to physical mapping for global memory partitions across all 8 boards (e.g., aggregated view of global partitions 156 of all 8 boards). In this representation 320, the logical to physical mapping includes concatenating alternating segments of a defined size from each board's global memory partition. In 320, the defined size may be ¼ GB. Each board's 4 GB global partition may be further divided into ¼ GB segments. The global memory logical to physical representation may be determined by alternating through boards 1-8 in a round robin fashion and concatenating a next ¼ GB segment of each such board. For example, as illustrated in FIG. 6, the logical representation for the first ½ GB of global memory logical address space maps to the following physical memory locations across boards 1 and 2: GM logical addresses 0 through (¼ GB-1) physically map to board 1's global partition (e.g., board 1, physical memory offsets 4 GB through 4¼ GB); and GM logical addresses ¼ GB through (½ GB-1) physically map to board 2's global partition (e.g., board 2, physical memory offsets 4 GB through 4¼ GB). Although element 320 illustrates that the logical to physical GM mapping uses a size of ¼ GB for purposes of illustration, an embodiment may select any size in accordance with the particular boundary requirements of the embodiment.

It should be noted that the representations 310 and 320 use a GM logical address range beginning at 0. The GM logical address of 0 may represent a first logical address or offset within, for example, the mapping 234 for director 1. The foregoing GM logical address may be equivalently represented using another logical address with respect to director 1's entire logical address range (e.g., GM logical address 0 is equivalent to director 1's logical address offset X in FIG. 5=256 KB+2 GB).

The MMU of each director on each board in the fabric may use a director-specific map as described above. Each director's MMU may use the same system global memory map representing the logical to physical mapping of global partitions across all boards. Thus, each director has its own director-specific memory map and uses a same system global memory map.

What will now be described are processing steps that may be performed by a director requesting access to a location in system global memory. The request may be a request to read from, or write to, global memory. Generally, the director determines the source logical address and the target logical address and translates each of the foregoing logical addresses into corresponding physical addresses. In one embodiment as described in more detail in following paragraphs, each of the physical addresses may be represented using a board identifier uniquely identifying one of the boards connected to the fabric, and physical memory offset identifying a location within the memory of the identified board. Each board connected to the fabric may be assigned, or otherwise associated with, a unique identifier as part of initialization processing. The requesting director then communicates the physical addresses for the request, along with the type of operation as a read or write request, to the FC on the same board as the director. The FC then forms the request using the physical addresses and sends the request over the fabric. The fabric, in particular the switch or other component which performs fabric routing, routes the request to the appropriate target board for servicing. The following describes in further detail processing performed by a director requesting to perform an operation with respect to a location in global memory. It should be noted that in the following example, a request for a director to read from global memory uses a source address which is in global memory (on any board) and a target address corresponding to location in either the private or shared partitions for the director. A request for a director to write to global memory uses a target address which is in global memory (on any board) and a source address corresponding to location in either the private or shared partitions for the director. To illustrate, assume the requesting director is director 1 of board A having the map 212 as represented in FIG. 5 and using the system global memory logical representation of 310 of FIG. 6. Each board also has a memory partitioned in accordance with 151 of FIG. 4 so that each board's global partition begins at physical memory offset 4 GB. The following is described with respect to a request to write to global memory.

In a first step, the requesting director 1 obtains a GM logical address as the target logical address. As an example, consider a GM logical address=0. Using the system global memory map of 310, director 1 then determines in a second step the target physical address as a physical GM address by translating the GM logical address to a board identifier and offset. The board identifier identifies the target board containing the desired global partition and the offset identifies a location with the target board's memory. As an example, GM logical address=0 maps to a physical address represented by "BOARD A, memory offset 4 GB". In a third step, director 1 determines the source logical address which is a logical address falling within the address range represented by 230 or 232 of FIG. 5. As an example, let the source logical address be logical address 0 in director 1's logical address space which is the starting or first address within 230 of FIG. 5. In a fourth step, director 1 determines the source physical address by translating the source logical address from step 3 into a physical address represented as a physical memory offset within the board, board A, that contains requesting director 1. In this example, the source logical address of 0 in director 1'*a* logical address space has a physical address represented as board A, memory offset 0. Subsequently, the requesting director 1 then communicates with the FC of board A to form a write GM request using the physical addresses of the source and target. The FC sends the request over the fabric which routes the request to the target board. In this example, the target board is board A and the fabric routes the request back to the FC of board A. In this example, the GM request originating from a first board may be forwarded out over the fabric even if the target is also the first board. A variation to the foregoing as may be alternatively performed in an embodiment when the sending and target boards are the same is described elsewhere herein.

The target board receives the GM request. Specifically, the FC of the target board may receive the request and perform filtering to determine whether the received request is a valid memory access request. In accordance with techniques herein, a sending board may only request access to those portions of memory of a target board corresponding to the global partition of the target board. For example, with reference to 151 of FIG. 4, a received request is only processed and considered valid by the target board if the request identifies a physical memory offset corresponding to the global partition 156 of the target board. The FC of the target board performs such processing to ensure that the GM request corresponds to a valid offset within the target board's memory (e.g., corresponding to the target board's global partition). If the request is determined as valid, the FC of the target board processes the request, and otherwise, an error message is returned. Processing of the request may vary with whether the request is to read from, or write to, global memory. If the request is to read from GM, the FC of the target board communicates with the MC of the target board to read the contents from the requested memory location on the target board. The FC of the target board returns the contents to the sending board's FC, and then MC, to write the contents in the source location of the sending board's memory. If the request is to write to GM, the FC of the target board communicates with the MC of the target board and stores the contents from source physical address to the target memory location in the target board's global partition. The FC may return an appropriate response to the sending board's FC.

Based on the foregoing, an FC of a board may perform filtering of received GM requests. The FC may be programmed in accordance with the particular physical address range or physical memory offsets considered valid for GM requests in an embodiment where such memory offsets correspond to the global partition of the target board. As described above, each FC of a board in the fabric has a dual role as both a sender of a GM request and also as a target or recipient of a GM request. Each FC can both send requests to other board's FC and also receive requests from another board's FC. When an FC functions as a recipient or target with respect to a GM request, the FC performs the filtering process as described above to ensure the request specifies a valid physical memory address of the target's memory, and then performs further processing in response to the received request. When valid, the request is processed and otherwise, the target board's FC may return an appropriate error message or response. In an embodiment in accordance with the techniques herein, each FC as a sender of a GM request has the ability to issue a request to read/write to any memory location on any board. Thus, a sending FC of a first board may issue a request to access a memory location of a target board's memory where the memory location may not be valid. For example, the sending FC may improperly request access to a location in another board's private or shared partition. Such requests should be disallowed. To prevent the requesting FC from being granted an improper or impermissible request (e.g., restrict requesting FC access to particular portions of a target FCs memory), each FC is programmed to recognize a particular physical address range or physical memory offset range which is considered valid when processing a request to access global memory where the request is received from over the fabric. For example, if each board's memory has its global partition located at the physical memory address range 4 GB-8 GB, then a receiving FC is programmed to only allow requests from a sending FC when the requests are to access memory locations in the valid range of 4 GB-8 GB.

Thus, as described above, requests by a director to access memory internal or within the same board as the director in the shared or private partitions is restricted by the MMU and director-specific memory map. Each FC of a board restricts requests accessing the board's memory, where such requests are received by the FC over the fabric, in accordance with a specified valid physical address or offset range. The receiving FC performs appropriate request filtering to process only requests having a valid physical memory location.

Figure 7:
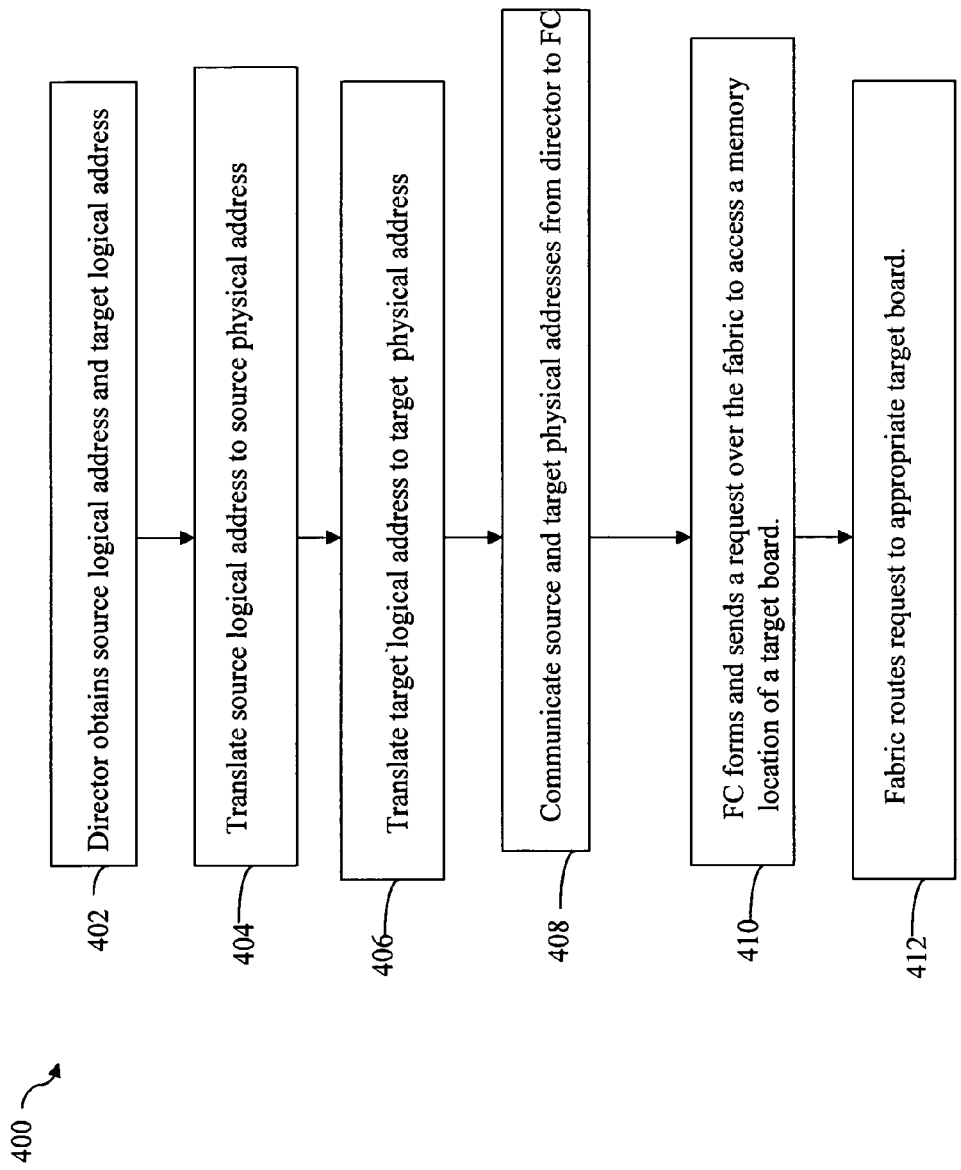
FIGS. 7 and 8 are flowcharts of processing steps that may be performed in an embodiment in accordance with techniques herein.
Figure 8:
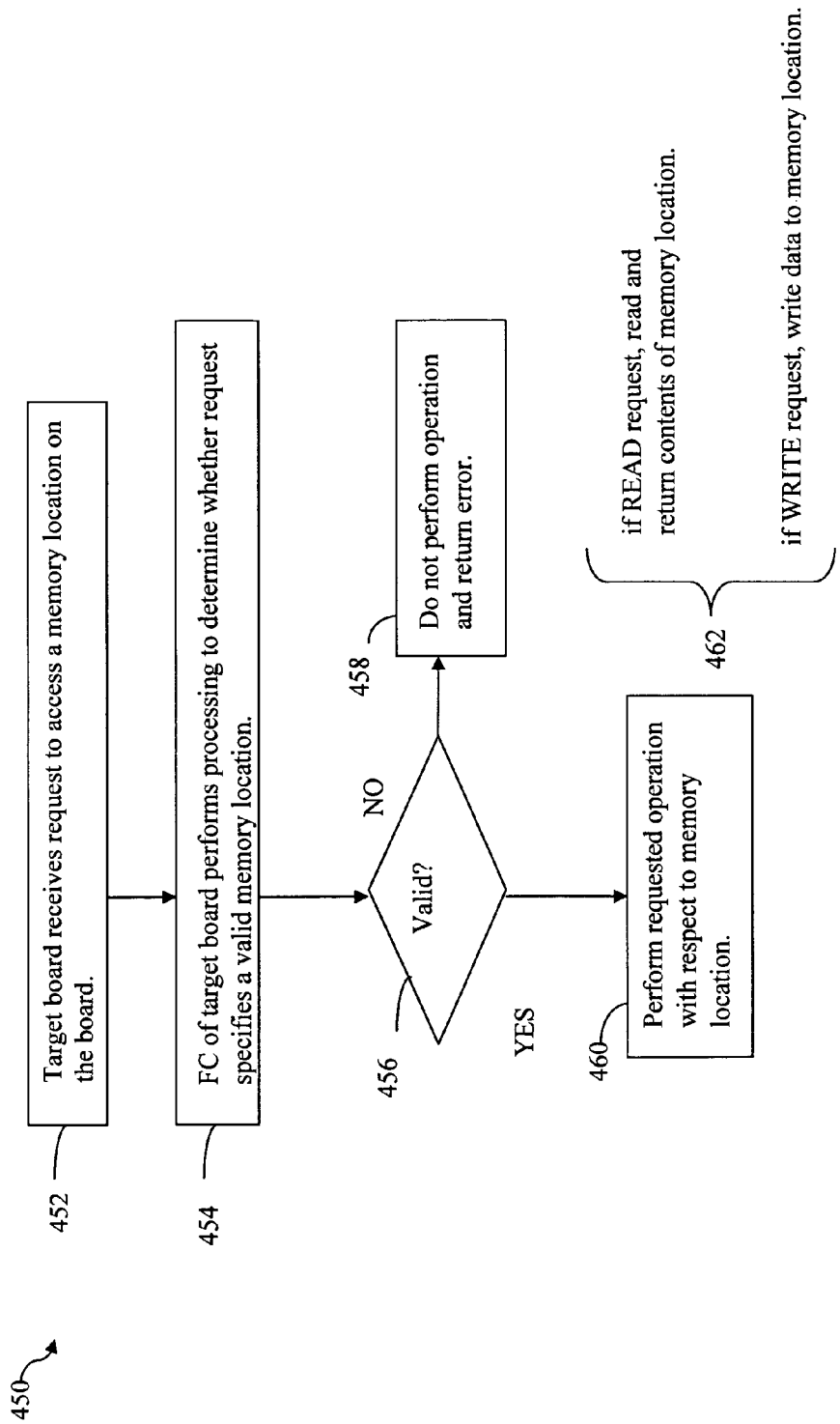

Referring to FIGS. 7 and 8, shown are flowcharts of processing steps that may be performed in an embodiment in accordance with techniques herein. The flowcharts of FIGS. 7 and 8 summarize processing described above. The flowchart 400 of FIG. 7 describes processing performed in connection with issuing a request to perform an operation with respect to global memory. The operation may be, for example, a request to read from or write to a location in a global memory partition having a corresponding physical address on the same or different board as the requesting director. At step 402, the requesting director obtains a source logical address and a target logical address. At step 404, the requesting director translates the source logical address to a source physical address. At step 406, the requesting director translates the target logical address to a target physical address. As described above, whether the global memory location is the source or target may vary with whether the request is to read from or write to global memory. At step 408, the requesting director communicates the source and target physical addresses to the sending FC. The sending FC resides on the same board as the requesting director. At step 410, the sending FC forms and sends a request over the fabric to access a location in the memory of the target board. At step 412, the fabric routes the request to the appropriate target board. It should be noted that the requesting director performs the foregoing logical to physical address translations using the system global memory map (e.g., 310 of FIG. 6) and also the requesting director's director-specific memory map (e.g., 212 of FIG. 5).

Continuing with processing of flowchart 450 of FIG. 8, the target board receives the request in step 452. At step 454, the FC of the target board performs processing to determine whether the request specifies a valid memory location on the target board. At step 456, a determination is made as to whether the memory location of the request is valid. If not, control proceeds to step 458 where the requested operation for the memory location is not performed ad the FC of the target board returns an error message to the sending board. Otherwise, if step 456 evaluates to yes, control proceeds to step 460 to perform the requested operation. The processing performed in step 460 may vary with the request. For example, as illustrated in 462, if the request is to read from the requested memory location, the contents of the memory location are read and returned to the sending board for storing in the target location on the sending board's memory. If the request is to write to the requested memory location, the contents of the source location are written to the memory location of the target boards' memory.

It should be noted that an initialization or configuration file for a board may identify all other boards in the system which are connected to the fabric. Such a file may also contain other information such as identify physical boundaries for each board's global partition so each director on the board can build the global memory map representing the logical to physical system global memory mapping. As described above, each board may be associated with a unique board identifier allowing for uniquely identifying each board with respect to all other boards (e.g., uniquely identify board 120*a* from boards 120*a*-120*d*). The board identifier may be a numeric identifier, alphanumeric, or other identifier. In one embodiment of data storage system, each board identifier may be determined based on the physical slot or location in the system into which the board is inserted. The board identifier may change if the same board is inserted into a different one of the slots.

An embodiment such as described herein with 8 boards, each such board comprising directors and a memory partitioning as illustrated in 151 of FIG. 4, provides a distributed global memory across multiple boards. Each such board having a global partition processes received global memory requests to access physical GM locations in the board's global partition. Having such a distributed global memory provides an advantage of distributing the load of GM requests among all boards. Additionally, having different types of memory and directors or processors integrated on the same physical board provides scalability in that as the number of boards increases, so do the number of directors, size of global memory, and also number of receiving FCs which process GM requests. Incorporating GM on the same boards with directors as in connection with the techniques herein eliminates the need for specialized and/or dedicated hardware to provide GM in a system.

Described in connection with FIG. 4 are examples of how memory of a single board may be partitioned. An embodiment using the techniques herein may also repartition the memory of one or more boards to vary the size, physical location or configuration of one or more of the global partition, private partition, and/or shared partition of the one or more boards. Such repartitioning may be accomplished by modifying the director-specific memory map, global memory map, and/or reprogramming the FCs to use an adjusted valid physical address or memory offset range for filtering GM requests received over the fabric.

Described above are embodiments in which the global partition of each board may be physically located in the same portion of memory (e.g., at the same physical memory offsets) on each board. As a variation, the global partition of one or more boards may be in different physical memory locations. In this case, the directors of the boards may communicate with one another as part of initialization or startup as to what are the physical locations of the global partition on each board. For example, the directors may communicate the foregoing information over another communication connection such as an Ethernet communication connection regarding the physical boundaries of each board's global partition.

In one embodiment as described above, all global memory requests are processed by a sending FC forming a request and sending the request over the fabric to a target FC (even when the request is to access global memory physically located on a same board as the requesting director). In this embodiment, the director-specific memory maps are not used to map to any physical memory locations included in system global memory. What will now be described is an alternate embodiment where requests to access global memory physically located on a same board as a requesting director may trigger performing an optimization so that such requests are not sent out over the fabric. Rather, in this latter embodiment, only requests to access global memory physically located on a different board than the requesting director are sent out over the fabric (e.g., via sending FC-target FC communication). In this latter embodiment, the director-specific memory map may be used in connection with accessing and processing requests to access global memory physically located on the same board as the requesting director as part of this optimization. For example, in this latter embodiment (with reference to FIG. 5 for example), director 1's logical address range of 234 may be used as a logical window mapping to a physical portion of board A's memory which is included in the global partition of board A. In this latter embodiment, the handling and processing of requests to access global memory physically residing on the same board as the requesting director are similar in some aspects to that as described herein for accessing a logical address located in the director's private segment mapping (e.g., 230 of FIG. 5) or shared partition mapping (e.g. 232). When a director is translating a GM logical address to a GM physical address (e.g., board id, memory offset), the director uses the system global memory map to determine whether the GM physical address resides on the same board as the director. If so, the optimization may be performed. The optimization processing includes the MMU of the director updating the director-specific memory map to map a portion of the director's logical address space to an appropriate window of physical memory of the board. The window corresponds to a segment of physical memory of the board's global partition and the segment includes the desired GM physical address. Subsequently, the director then accesses the desired GM physical address (in the memory of the board of the requesting director) by communicating with the MC and using the updated director-specific memory map (e.g., in a manner similar to how the director accesses locations in its mapped segment of the private partition and also the shared partition). Specifically, the director communicates with the MC to obtain the contents of the GM physical address.

Additionally, as a further variation, assume that this latter embodiment also provides for GM mirroring so that a global memory logical address may map to two different physical locations in global memory. It should be noted that although following examples may be made with reference to an embodiment using GM mirroring, an embodiment including the optimization may also not include GM mirroring so that each GM logical address maps to at most a single physical memory location. It should also be noted that an embodiment implementing GM mirroring may mirror each GM logical address, or selectively mirror portions of GM where the portions collectively correspond to less than the entire GM logical address space.

Figure 9:
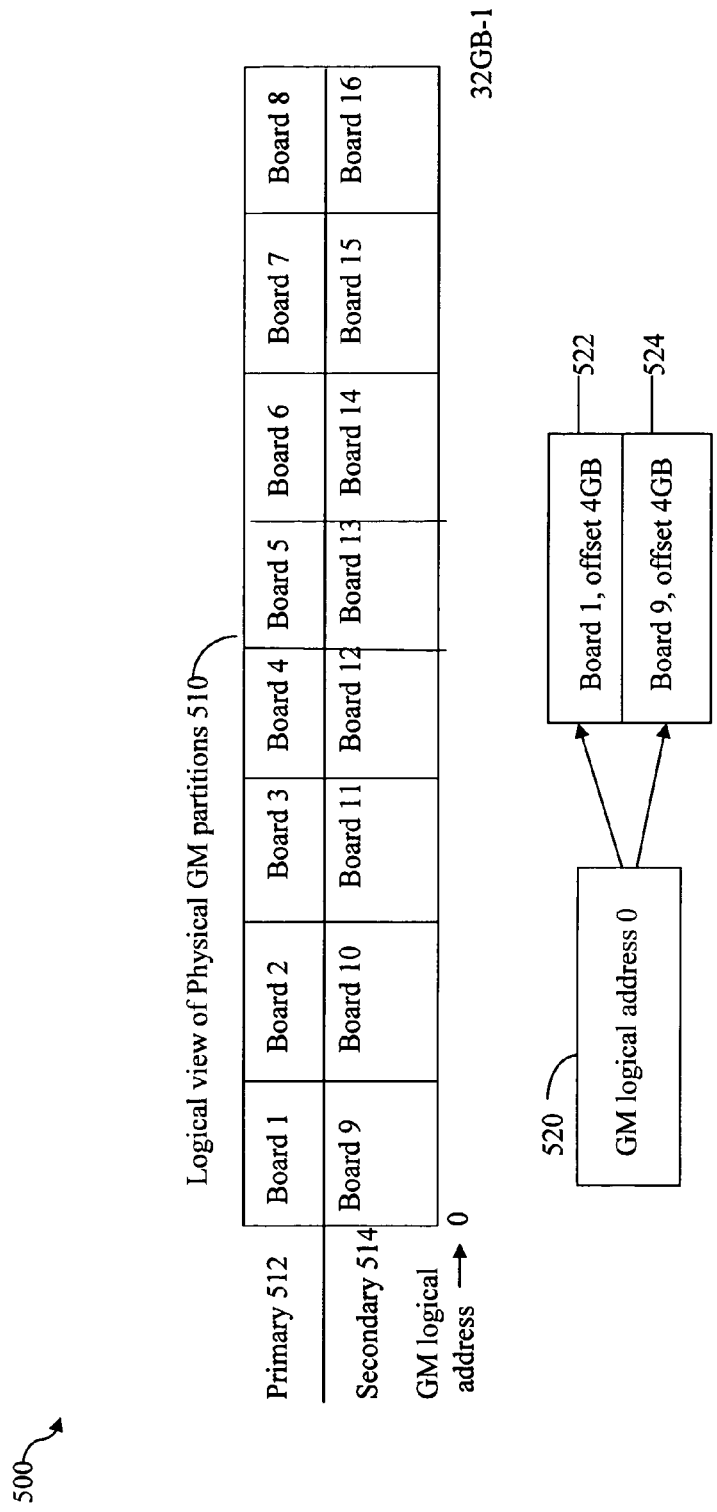
FIG. 9 is an example illustrating a system global memory map in an embodiment using mirroring in accordance with techniques herein.

Referring to FIG. 9, shown is an example of a system global memory map that may be used in an embodiment which mirrors global memory in a system. In this exemplary system, there are 16 boards each having a global partition size of 4 GB and each of the 16 boards having a logical partitioning of the board's memory as illustrated in element 151 of FIG. 4 (e.g., each global partition physically begins at board memory offset 4 GB). Element 510 may represent the system global memory map used. Element 510 illustrates that each GM logical address is mapped to a first physical location on a first or primary target board 512, and also mapped to a second physical location on a second or secondary target board 514. As an example, GM logical address 0 (element 520) maps to a first physical location 522 represented as board 1, offset 4 GB and a second physical location 524 represented as board 9, offset 4 GB.

As described above in connection with FIG. 6, the physical memory layout represented by 510 for the GM logical address space may vary. For example, the ordering and/or position of the board numbers of the physical memory layout may vary from that as illustrated in FIG. 9.

In an embodiment having GM mirroring as illustrated in FIG. 9, it should be noted that whether a requested operation (e.g., read to global memory, write to global memory) may be performed using only the primary mirrored copy or, alternatively, either one of the primary or secondary mirrored copy may vary. For example, one of the primary and secondary boards may have been corrupted, damaged or removed, a secondary target board may not be mapped for a particular GM logical address portion, and the like. Therefore, when performing GM logical to GM physical address translation in an embodiment with GM mirroring, an embodiment may determine two target boards for a single GM logical address. The two target boards may correspond to the target boards of the two physical addresses determined as a result of address translation. The two target boards may represent the pair of target boards designated as the primary and secondary boards in accordance with the system global memory map (e.g., a column of board ids as illustrated in 510 of FIG. 9). The requesting director may then determine which one or more of the two target boards may be used with servicing the request, and whether any such target board is the same board as that of the requesting director. If the request can be serviced using a physical global memory location on the same board as the requesting director, then an optimization can be performed as described herein where the requesting director's memory map is adjusted to map into an appropriate physical memory window including the desired physical global memory location.

Figure 10:
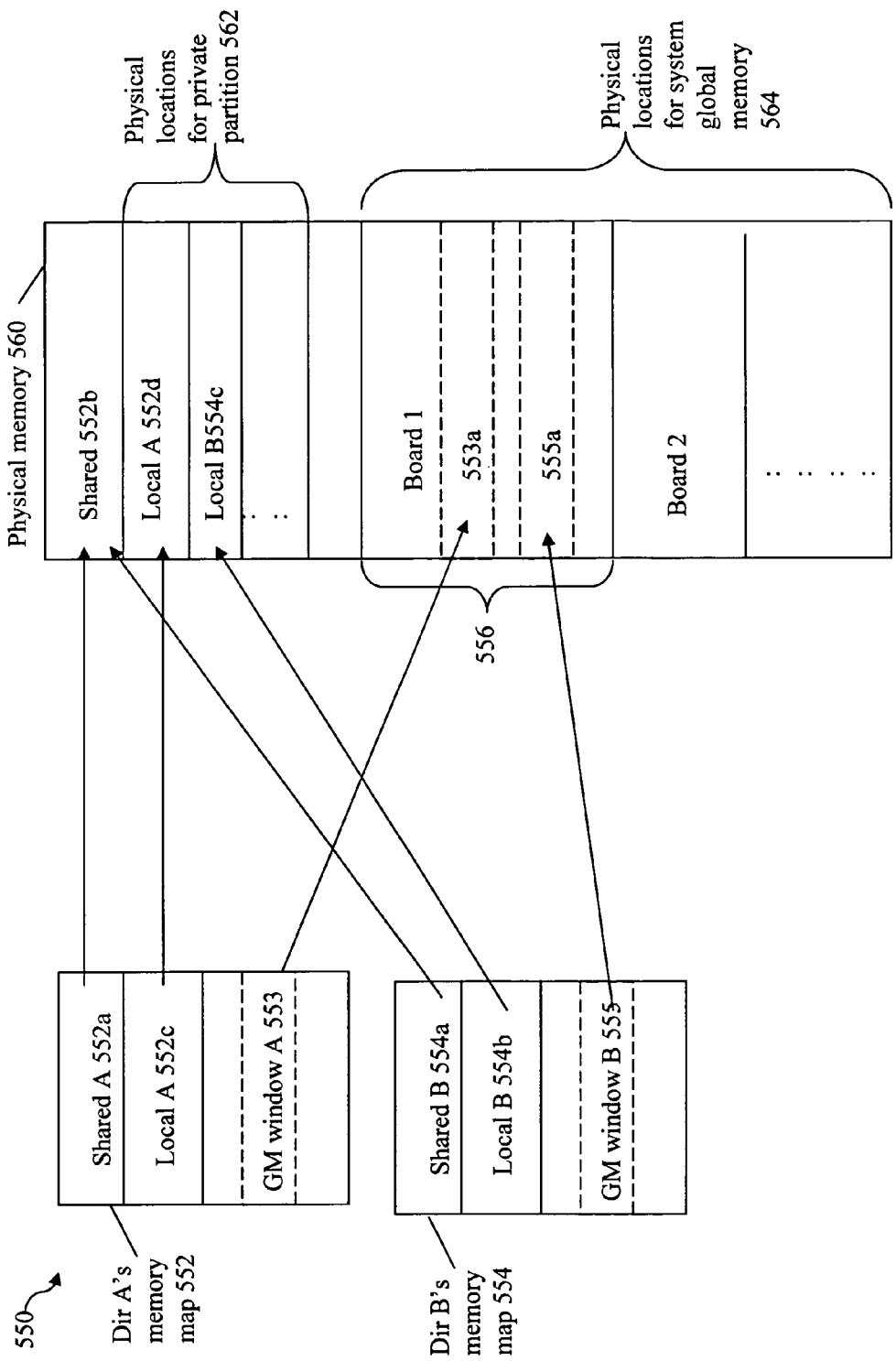
FIG. 10 is an example illustrating director-specific maps that may be used in an embodiment in accordance with techniques herein.

Referring to FIG. 10, shown is an example of director-specific memory maps that may be used in connection with an embodiment in accordance with techniques herein. For the example 550, assume that director A and director B are located on a same board, board 1, and that board 1 has a memory partitioned as illustrated in 151 of FIG. 4. The example 550 includes director-specific memory map 552 for director A and director-specific memory map 554 for director B. Each of 552 and 554 illustrate logical to physical memory mappings for the corresponding directors. Element 556 represents the portion of board 1's physical memory included in board 1's global partition of the system global memory distributed across a plurality of boards. It should be noted that in connection with the example 550, board 1 is one of a plurality of boards configured in a similar manner (e.g., including a plurality of directors, having GM mirroring, and having memory partitioned in accordance with 151 of FIG. 4).

The logical address range of 552a is mapped to physical memory 552b corresponding to director A's shared partition of board 1, the logical address range of 552c is mapped to physical memory 552d corresponding to director A's portion of the private partition of board 1, and logical address range 553 is mapped to physical memory 553a corresponding to a physical memory segment of board 1's global partition 556. The logical address range of 554a is mapped to physical memory 552b corresponding to director B's shared partition of board 1, the logical address range of 554b is mapped to physical memory 554c corresponding to director B's portion of the private partition of board 1, and logical address range 555 is mapped to physical memory 555a corresponding to a physical memory segment of board 1's global partition 556. Each of 553 and 555 may be characterized as a window of a director's logical address space which maps to a segment of physical memory on board 1 included in board 1's global partition. The logical address range of 553 may be mapped by director A's MMU as part of performing the optimization processing described herein for director A to access a global memory location physically residing on the same board as director A. As described above, map 552 may be updated by director A when director A performs GM logical to physical address translation to access a GM logical address having a corresponding physical location within 553a. In a similar manner, the logical address range of 555 may be mapped by director B's MMU as part of performing the optimization processing described herein for director B to access a global memory location physically residing on the same board as director B. Each of 553 and 555 may, respectively, be further updated as each of directors A and B request access to other GM logical addresses mapped to different physical locations of 556.

Once director A has updated its map 552 to map 553 to 553a, director A may communicate with the MC of board 1 to access a requested global memory location physically residing in the memory of board 1, where such location is physically within 553a). Once the map 552 is updated as illustrated, accessing the requested global memory location within 553a may be performed in a manner similar to that as when director A accesses a physical location within 552b or 552d. The above-mentioned optimization of processing a global memory request when the request references physical memory located on the same board as the requester may be performed rather than forward all GM requests out to the fabric even if the request is for global memory located on the same board as the requesting director. Use of the foregoing optimization provides for improved system performance by decreasing latency for such GM requests and reducing the total amount of fabric bandwidth utilized to process GM requests.

Figure 11:
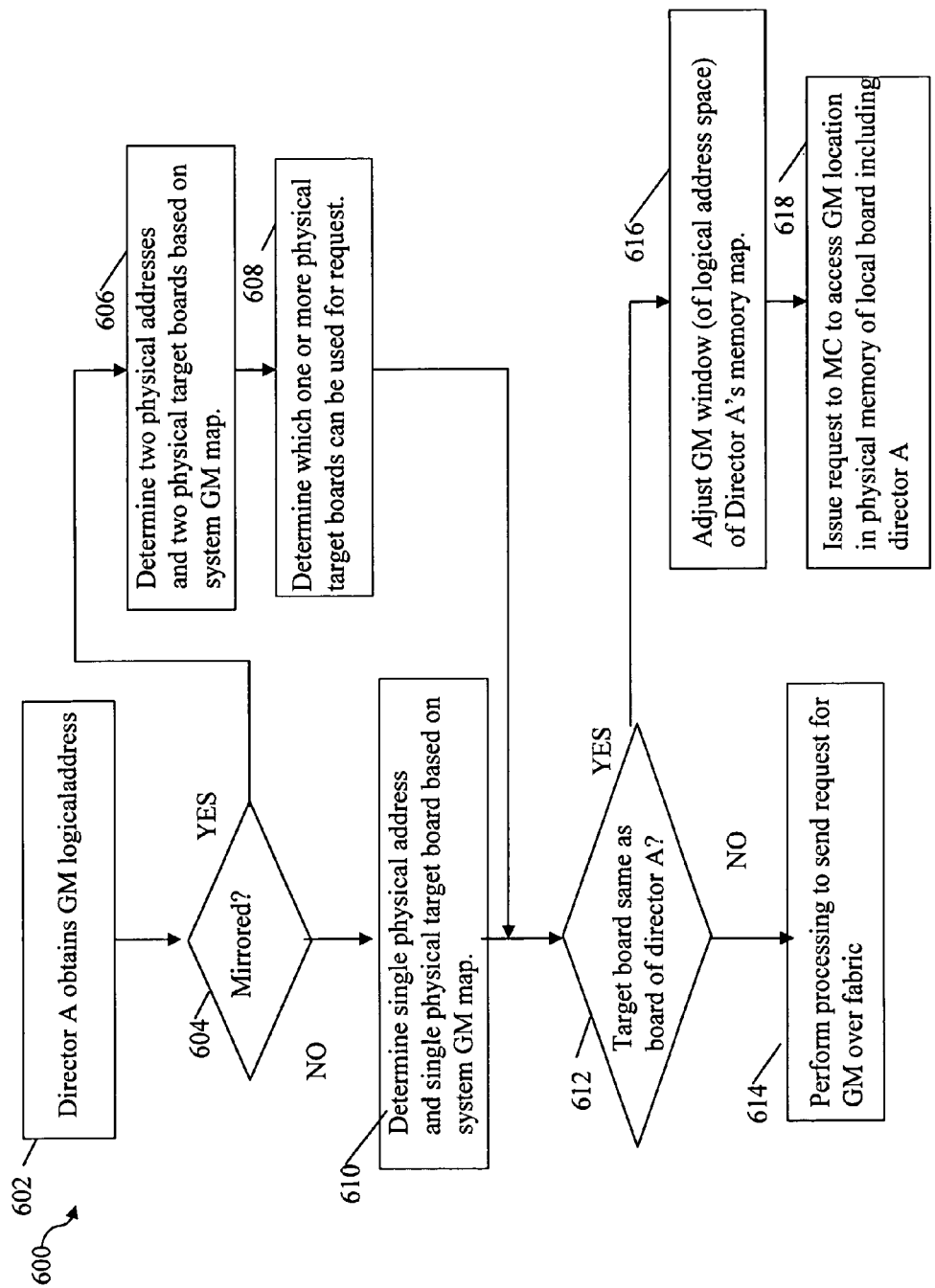
FIG. 11 is a flowchart of processing steps for an optimization that may be performed in an embodiment in accordance with techniques herein.

Referring to FIG. 11, shown is a flowchart of processing steps that may be performed in an embodiment in accordance with techniques herein. The flowchart 600 summarizes processing as described above in an embodiment which may perform the optimization in connection with performing address translation for a GM logical address when servicing global memory requests. The flowchart 600 is illustrated with respect to director A and includes steps that may be performed for a logical address of a director, where the logical address corresponds to a GM logical address residing within a logical address range of director A mapped to the global partition of board 1 (upon which director A physically resides).

At step 602, director A obtains a GM logical address. At step 604, a determination is made as to whether the global memory of board 1 including director A is mirrored. If so, control proceeds to step 606 to determine two physical addresses, using the system GM map, for the GM logical address of step 602. From the two physical addresses, identifiers for the two target boards are extracted. In step 608, director A determines which one or more target boards of step 606 may be used for servicing the GM request. Control proceeds to step 612. If step 604 evaluates to no, control proceeds to step 610 to determine a single physical address, using the system GM map, for the logical address of step 602. Control proceeds to step 612. It should be noted that in an embodiment, mirroring may be performed selectively, for example, such as for data which is the subject of a write operation but not other data which is the subject of a read operation. In such an embodiment, step 604 may be performed only for data which is the subject of a write operation. For data other than that which is the subject of a write operation, the embodiment may not perform mirroring and processing may always proceed along the logical path corresponding to step 610 (e.g., step 604 always evaluates to no mirroring for such other data which is not the subject of a write operation).

At step 612, a determination is made as to whether any of the one or more target boards (e.g., from step 610 or step 608) identifies the same board including director A. If step 612, evaluates to no, the optimization is not performed and control proceeds to step 614 to continue processing the GM request as described above to send the GM request over the fabric. If step 612 evaluates to yes, the optimization is performed. Control proceeds to step 616 to adjust the GM logical address window (e.g., 553) of director A's memory map as needed to map to an appropriate portion of physical memory of board 1's global partition, where the portion includes the data necessary to service the GM request. At step 618, director A communicates with board 1's MC to access the desired location in the global partition of board 1. It should be noted that director A performs additional processing than as illustrated for a second operand of the GM request. As described above, which of the GM location and the second operand correspond, respectively, to the source and target of the request depends on whether the request is to read to, or write from the desired GM location.

Figure 12:
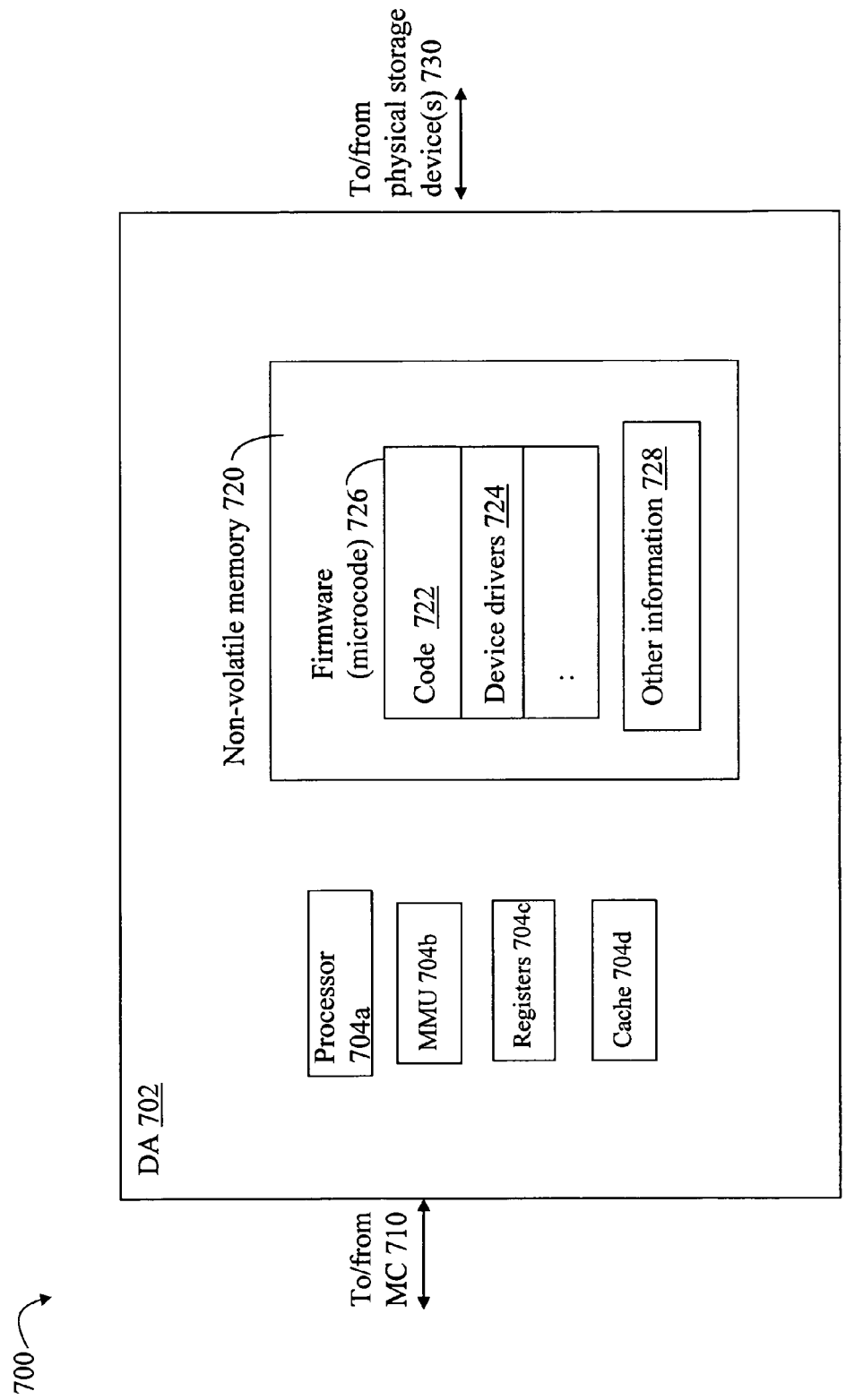
FIG. 12 is an example illustrating in more detail a director that may be included in an embodiment in accordance with techniques herein.

Referring to FIG. 12, shown is an example illustrating a DA in more detail as may be included in an embodiment using the techniques herein. The example 700 illustrates a DA 702 including a processor 704a, MMU 704b, registers 704c, cache 704d, and a non-volatile memory (NVM) 720. An embodiment of a DA 702 may include other components than as illustrated. In one arrangement, functionality of 704a-704d (and possibly other components not illustrated) may be embodied in an integrated component. Components which are not integrated may communicate over an internal bus (not illustrated). The DA 702 may communicate with the memory controller (MC) as illustrated by 710 and write/read data to/from the physical storage devices as represented by 730. The NVM 720 may include microcode or firmware 726. The firmware 726 may include code 722, device drivers 724, and other code used by the DA. The code 722 may include code for performing operations and functionality such as, for example, destaging data to devices serviced by the DA, reading data from devices serviced by the DA, and the like. The NVM 720 may also include other information 728, such as code and/or data used by the DA. It will be appreciated that other directors may include components similar to those as described and illustrated for a DA with appropriate modifications and differences varying with director type. For example, an HA may include appropriate code for performing its particular operations and functionality.

It should be noted that the particular representations of data, data structures, and the like, described herein are exemplary and use of the techniques herein should not construed as being limited to these examples. For example, a director-specific map such as 212 and 214 of FIG. 5 may be represented in a variety of different forms, all of which may be represented as illustrated in FIG. 5.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for partitioning memory comprising:
providing a plurality of boards, each of said plurality of boards including a physical memory portion and a set of one or more processors; and
partitioning the physical memory portion in each of said plurality of boards into a plurality of logical partitions including a global memory partition accessible by any processor on any of the plurality of boards and one or more other memory partitions configured for use by one or more processors of said each board, each of said one or more other memory partitions not being accessible to a processor on a board other than said each board, wherein said one or more other memory partitions of said each board include a shared memory partition accessible to all processors on said each board and a private memory partition including a section for each processor on said each board wherein each section of the private memory partition used by an associated processor of said each board is used exclusively by said associated processor, and wherein each processor on said each board uses a memory map having a logical address range including a first logical address range portion that maps to a first section in the private memory partition used exclusively by said each processor, a second logical address range portion that maps to said shared memory partition of said each board, and a third portion mapping to global memory of the global memory partition whereby said global memory is used by said each processor and located on said each board.

2. The method of claim 1, wherein said shared memory partition on said each board is not accessible by any processor on a board other than said each board.

3. The method of claim 2, wherein the plurality of logical partitions of said each board do not overlap each other in the physical memory portion of said each board.

4. The method of claim 2, wherein each processor on one of said plurality of boards is configured to translate a logical address of said each processor to a physical address identifying a location in one of the physical memory portions of one of the plurality of boards.

5. The method of claim 4, wherein the physical address identifies a location in a section of the private memory partition for said each processor on said one board, a location in a shared memory partition on said one board, or a location in a global memory partition on any one of the plurality of boards.

6. The method of claim 1, wherein each of the global memory partitions of each of said plurality of boards is located at a same physical location in the physical memory portion on said each board.

7. The method of claim 1, wherein each of the plurality of boards includes a fabric connector, each of the fabric connectors on one of the plurality of boards configured to communicate with other fabric connectors on other ones of the plurality of boards.

8. The method of claim 7, wherein each of the fabric connectors is configured to filter improper requests to access physical memory on said one board including said each fabric connector, said improper requests being received over a connection from another one of the fabric connectors.

9. The method of claim 1, wherein each processor on one of said plurality of boards is configured in accordance with a map indicating what portions of physical memory on a same board as said each processor are accessible to said each processor, said map being a memory map for said each processor.

10. The method of claim 9, wherein a system global memory includes said global memory partitions of said plurality of boards, said plurality of boards configured to communicate with one another over a connection used to request access to a location in any one of the global memory partitions on any of said plurality of boards.

11. The method of claim 1, wherein the global memory partition of a first of said plurality of boards is located at a first physical location in the physical memory portion on said first board, and the global memory partition of a second of the plurality of boards is located at a second physical location in the physical memory portion on said second board, said first physical location being different from said second physical location.

12. The method of claim 11, wherein each processor on one of said plurality of boards is included in a director of a data storage system, said director also including a memory management unit.

13. The method of claim 12, wherein the memory management unit of each director including said each processor is configured to use the memory map of said each processor representing locations accessible to said each director where said locations are in physical memory on a board including said each director, said memory management unit restricting access to physical memory locations represented by the map.

14. The method of claim 13, wherein the memory management unit is configured to use a global memory map representing a logical to physical mapping of a system global memory including said global memory partitions of said plurality of boards.

15. The method of claim 14, wherein the global memory map represents a global memory logical address space mapped to physical segments of alternating global memory partitions on said plurality of boards.

16. The method of claim 15, wherein each of said physical segments of memory has a first size less than a second size of any global memory partition on any of said plurality of boards.

17. A data storage system comprising:
a plurality of boards, each of said plurality of boards including a physical memory portion and a set of one or more directors, wherein the physical memory portion in each of said plurality of boards is partitioned into a plurality of partitions including three logical partitions comprising a global memory partition accessible by any director on any of the plurality of boards, a shared memory partition accessible to directors on said each board, and a private memory partition including a section for each director on said each board, wherein each section of the private memory partition used by an associated director of said each board is used exclusively by said associated director; and
each of said one or more directors on each of said plurality of boards includes a processor and a memory management unit configured to use a director map and a global memory map, said director map representing locations in physical memory accessible to said each director, said memory management unit restricting access by said each director to physical memory locations represented by the director map, said global memory map representing a logical to physical mapping of a system global memory including said global memory partitions of said plurality of boards, wherein each director on said each board uses the directory map having a logical address range including a first logical address range portion that maps to a first section in the private memory partition used exclusively by said each director, a second logical address range portion that maps to said shared memory partition of said each board, and a third portion mapping to global memory of the global memory partition whereby said global memory is used by said each director and located on said each board.

18. The data storage system of claim 17, wherein each one of said plurality of boards includes a fabric connector configured to communicate with other fabric connectors of other ones of said plurality of boards, each fabric connector on one of said plurality of boards configured to restrict access of a received request from another fabric connector to only the global memory partition on said one board, and where the director map for said each director specifies logical to physical memory mappings for physical memory locations only on a board including said each director.

19. A non-transitory computer-readable storage medium comprising code stored thereon that, when executed by a processor, partitions memory, the non-transitory computer-readable storage medium comprising code that performs processing including:
partitions a physical memory portion of each of a plurality of boards, each of said plurality of boards including a set of one or more processors, the physical memory portion in each of said plurality of boards being partitioned into a plurality of logical partitions including a global memory partition accessible by any processor on any of the plurality of boards and one or more other memory partitions configured for use by one or more processors of said each board, each of said one or more other memory partitions not being accessible to a processor on a board other than said each board, wherein said one or more other memory partitions of said each board include a shared memory partition accessible to all processors on said each board and a private memory partition including a section for each processor on said each board wherein each section of the private memory partition used by an associated processor of said each board is used exclusively by said associated processor, and wherein each processor on said each board uses a memory map having a logical address range including a first logical address range portion that maps to a first section in the private memory partition used exclusively by said each processor, a second logical address range portion that maps to said shared memory partition of said each board, and a third portion mapping to global memory of the global memory partition whereby said global memory is used by said each processor and located on said each board.

* * * * *